US010542381B2

(12) United States Patent
Taboso et al.

(10) Patent No.: US 10,542,381 B2
(45) Date of Patent: Jan. 21, 2020

(54) SYSTEM AND METHOD OF AIRCRAFT SURVEILLANCE AND TRACKING

(71) Applicant: The Boeing Company, Chicago, IL (US)

(72) Inventors: Pedro Taboso, Madrid (ES); Rosa Maria Rodriguez Montejano, Madrid (ES)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 15/587,089

(22) Filed: May 4, 2017

(65) Prior Publication Data
US 2018/0027382 A1 Jan. 25, 2018

(30) Foreign Application Priority Data
Jul. 21, 2016 (EP) .................................... 16382356

(51) Int. Cl.
*H04W 4/029* (2018.01)
*H04W 4/021* (2018.01)
(Continued)

(52) U.S. Cl.
CPC ........... *H04W 4/029* (2018.02); *H04W 4/021* (2013.01); *H04W 4/08* (2013.01); *H04W 84/06* (2013.01)

(58) Field of Classification Search
CPC ......... G06F 16/00; G06F 3/00; G08G 5/0013; G08G 5/0026; G08G 5/0043;
(Continued)

(56) References Cited

U.S. PATENT DOCUMENTS 6,133,867 A * 10/2000 Eberwine .............. G01S 5/0072
342/125
6,243,647 B1 * 6/2001 Berstis .................. G01S 5/0072
701/482

(Continued)

OTHER PUBLICATIONS

European Patent Office; European Office Action for Application No. 16382356.0 dated Sep. 11, 2017.
(Continued)

*Primary Examiner* — Babar Sarwar
(74) *Attorney, Agent, or Firm* — Parsons Behle & Latimer

(57) ABSTRACT

Described are systems and methods of aircraft surveillance and tracking. A method for aircraft tracking includes partitioning an airspace region into multiple sectors and generating multiple data structures corresponding respectively to each of the multiple sectors. Each data structure has a primary identifier and at least one secondary identifier that matches the primary identifier corresponding to the at least one other sector. The method includes receiving at least one data packet from an aircraft located within one of the multiple sectors, storing the aircraft data from the data packet within the data structure corresponding to the one of the sectors, storing the aircraft data within each of the data structures that has a secondary identifier matching the primary identifier, and for each of the multiple sectors, sending each aircraft within the sector aircraft data stored within the data structure corresponding to the sector.

20 Claims, 11 Drawing Sheets

(51) Int. Cl.
*H04W 4/08* (2009.01)
*H04W 84/06* (2009.01)

(58) Field of Classification Search
CPC .. G08G 5/0052; G08G 5/0078; G08G 5/0082; H04W 4/021; H04W 4/029; H04W 4/08; H04W 84/06
See application file for complete search history.

(56) References Cited

U.S. PATENT DOCUMENTS

| | | | |
|---|---|---|---|
| 6,275,771 B1 | 8/2001 | Berstis et al. | |
| 6,314,363 B1* | 11/2001 | Pilley | G01C 23/00 |
| | | | 701/120 |
| 7,263,518 B2* | 8/2007 | Ledingham | G08G 5/0013 |
| 7,605,688 B1* | 10/2009 | Seah | G01S 13/825 |
| | | | 340/425.5 |
| 7,708,493 B2* | 5/2010 | Jung | G09F 9/30 |
| | | | 116/63 R |
| 8,612,530 B1* | 12/2013 | Sapovalovs | H04L 43/50 |
| | | | 707/602 |
| 8,660,526 B1* | 2/2014 | Heiderscheit | H04M 1/72572 |
| | | | 455/404.2 |
| 9,225,633 B2* | 12/2015 | Jeng | H04L 45/16 |
| 9,310,477 B1 | 4/2016 | Sampigethaya | |
| 9,718,557 B2* | 8/2017 | Zubairi | B64D 45/00 |
| 9,922,571 B1* | 3/2018 | Greenleaf | G08G 5/0013 |
| 10,102,755 B1* | 10/2018 | Hamilton | G08G 5/0013 |
| 10,212,076 B1* | 2/2019 | Morris | H04L 61/1511 |
| 2002/0091834 A1* | 7/2002 | Isozu | H04L 29/06027 |
| | | | 709/227 |
| 2004/0001509 A1* | 1/2004 | Zhang | H04L 69/16 |
| | | | 370/466 |
| 2004/0098479 A1* | 5/2004 | Bennett | H04L 43/0852 |
| | | | 709/224 |
| 2004/0116106 A1* | 6/2004 | Shishido | H04L 29/06 |
| | | | 455/414.2 |
| 2004/0141513 A1* | 7/2004 | Takechi | H04L 29/12358 |
| | | | 370/401 |
| 2005/0272421 A1* | 12/2005 | Vare | H04W 4/023 |
| | | | 455/432.1 |
| 2007/0022479 A1* | 1/2007 | Sikdar | H04L 63/0218 |
| | | | 726/22 |
| 2007/0162197 A1 | 7/2007 | Fleming | |
| 2008/0004792 A1 | 1/2008 | Wise et al. | |
| 2008/0039085 A1* | 2/2008 | Phan-Anh | H04L 29/12188 |
| | | | 455/435.1 |
| 2008/0133705 A1* | 6/2008 | Lemond | G06Q 30/04 |
| | | | 709/217 |
| 2009/0103452 A1* | 4/2009 | Horvath | H04B 7/18506 |
| | | | 370/254 |
| 2009/0147759 A1* | 6/2009 | Um | H04W 8/04 |
| | | | 370/338 |
| 2009/0268730 A1* | 10/2009 | Sanjeewa | H04L 1/0002 |
| | | | 370/389 |
| 2010/0014517 A1* | 1/2010 | Huang | H04W 36/0033 |
| | | | 370/389 |
| 2010/0114484 A1* | 5/2010 | Kida | G06F 16/29 |
| | | | 701/532 |
| 2010/0265932 A1* | 10/2010 | Inoue | H04H 20/61 |
| | | | 370/338 |
| 2010/0284331 A1* | 11/2010 | Weniger | H04W 8/082 |
| | | | 370/328 |
| 2010/0309051 A1* | 12/2010 | Moshfeghi | H04W 4/029 |
| | | | 342/378 |
| 2011/0038372 A1* | 2/2011 | Wijayanathan | H04W 8/26 |
| | | | 370/389 |
| 2011/0063159 A1* | 3/2011 | O'Neil | G01S 5/0072 |
| | | | 342/29 |
| 2011/0277027 A1* | 11/2011 | Hayton | H04L 63/0815 |
| | | | 726/8 |
| 2011/0314488 A1* | 12/2011 | Keen | H04B 7/18506 |
| | | | 725/23 |
| 2012/0047572 A1* | 2/2012 | Duncan | H04L 63/0245 |
| | | | 726/13 |
| 2012/0177053 A1* | 7/2012 | He | H04L 45/04 |
| | | | 370/392 |
| 2012/0177198 A1* | 7/2012 | Cabos | H04L 9/0825 |
| | | | 380/270 |
| 2012/0303253 A1* | 11/2012 | Irfan | G08G 5/0026 |
| | | | 701/120 |
| 2013/0126679 A1* | 5/2013 | Estkowski | G08G 5/0013 |
| | | | 244/190 |
| 2013/0150004 A1* | 6/2013 | Rosen | H04W 8/22 |
| | | | 455/414.1 |
| 2013/0155965 A1* | 6/2013 | Koodli | H04W 64/003 |
| | | | 370/329 |
| 2013/0157611 A1* | 6/2013 | Small | H04W 76/50 |
| | | | 455/404.2 |
| 2013/0165157 A1* | 6/2013 | Mapes | H04W 4/029 |
| | | | 455/456.5 |
| 2013/0230035 A1* | 9/2013 | Grandhi | H04W 48/16 |
| | | | 370/338 |
| 2014/0010223 A1* | 1/2014 | Wang | H04W 48/12 |
| | | | 370/338 |
| 2014/0059192 A1* | 2/2014 | Miklos | H04W 8/082 |
| | | | 709/221 |
| 2014/0189156 A1* | 7/2014 | Morris | H04L 45/745 |
| | | | 709/238 |
| 2014/0198719 A1* | 7/2014 | Vanderveen | H04L 67/16 |
| | | | 370/328 |
| 2015/0065147 A1* | 3/2015 | Kuwahara | H04W 36/32 |
| | | | 455/441 |
| 2016/0050013 A1* | 2/2016 | Brownjohn | H04W 4/021 |
| | | | 370/316 |
| 2016/0309291 A1* | 10/2016 | Rodriguez Montejano | |
| | | | H04W 4/021 |
| 2016/0328979 A1* | 11/2016 | Postrel | B64C 39/024 |
| 2016/0335900 A1* | 11/2016 | Nordine | H04Q 9/00 |
| 2017/0127231 A1* | 5/2017 | Patil | H04W 4/06 |
| 2017/0142683 A1* | 5/2017 | Wu | H04W 64/00 |
| 2017/0214454 A1* | 7/2017 | Wang | G01S 5/0027 |
| 2018/0027382 A1* | 1/2018 | Taboso | H04W 4/029 |
| | | | 370/312 |
| 2018/0249365 A1* | 8/2018 | Cho | H04W 28/02 |
| 2018/0308298 A1* | 10/2018 | Eluganti | B64C 39/024 |
| 2019/0007812 A1* | 1/2019 | Shilov | H04W 4/029 |

OTHER PUBLICATIONS

European Patent Office; European Search Report; European Patent Application No. 16382356.0; dated Feb. 1, 2017.
European Patent Office; European Office Action European Patent Application No. 16382356.0; dated Feb. 27, 2017.

* cited by examiner

SYSTEM AND METHOD OF AIRCRAFT SURVEILLANCE AND TRACKING

CROSS-REFERENCE TO RELATED APPLICATIONS

This application claims the benefit of, and priority to, European Patent Application No. 16382356.0, filed on Jul. 21, 2016 and entitled "System and method of aircraft surveillance and tracking," the contents of which are herein incorporated by reference in their entirety.

FIELD OF THE INVENTION

The present disclosure relates to the field of aircraft surveillance and the tracking of aircraft.

BACKGROUND OF THE INVENTION

Current air-traffic communication systems, such as primary and secondary radars, multilateration systems, and Automatic Dependent Surveillance-Broadcast (ADS-B) present several limitations. For example, these communication systems do not provide global coverage. Also, current communication systems are close to saturation. For instance, ADS-B uses a significant amount of resources, particularly in the 1090 MHz band, to transmit data to an airplane within an area of interest. As such, in some areas the 1090 MHz band may be reaching a data bandwidth limit.

As a result, current communication systems may be unable to manage the expected growth of air traffic density for the upcoming years. Of particular concern is the rising number of aircraft, including unmanned aircraft vehicles (UAVs) that will make use of the communication systems.

New technologies are arising to deal with this air traffic density growth. One of these emerging technologies is Internet Protocol (IP)-based communication. Internet connectivity available onboard ("Internet onboard") is a new development that provides global coverage for communications. Because this type of communication does not use traditional radio links (such as VHF or 1090 MHz), but instead relies on a satellite link to a wide area network (WAN), such as the Internet, the range of the system is not limited by the distance between emitter and receiver.

In a typical ADS-B system, relying on an IP-based communication link, an aircraft sends location data at a rate of twice per second. A ground-based server receives the location data, and sends back to the aircraft, information including location data of other airplanes located within a certain distance range of the aircraft. Currently, in order to determine the information to be sent back to each aircraft, the ground-based server needs to calculate the distance between every pair of registered aircraft. This means that, because there are around twenty thousand concurrent flights worldwide, for each cycle (0.5 seconds) the server has to compute around 400 million distances between aircraft pairs. Because these calculations are trigonometry-based, the server may become overloaded, adding to the difficulty of the calculations.

Therefore, there is a need to reduce the amount of resources needed by the server to determine the information to be sent to each of the aircraft. Other disadvantages may exist.

SUMMARY OF THE INVENTION

Disclosed is an aircraft surveillance and tracking system and method based on the Internet connectivity available onboard an aircraft. The aircraft surveillance and tracking platform implements client applications, which may differ based on each potential user (aircraft, airline, air traffic control (ATC)), and a server application. The server application handles receiving and distributing the information among the different clients.

In an embodiment, and aircraft surveillance and tracking method includes:

An aircraft determining its location (geographical coordinates).

The aircraft sending data including its location to a ground-based server.

The server storing the received information.

The server sending back to the aircraft data about surrounding aircraft (those within a certain range, normally of around 120 nautical miles).

The server also sending information to other clients according to their need-to-know (e.g. tracking of all the aircraft fleet to a determined airline, or to the aircraft within an area of interest for an Air Traffic Control).

In order to establish a surveillance system where the information from/to aircraft is transmitted using the onboard available broadband internet connection, it is beneficial to minimize the information exchanged between ground-based servers and aircraft, and to optimize the trigonometric calculation processes needed to determine the surrounding air traffic.

The present disclosure deals with these two issues. An aircraft may autonomously generate a geographically-based network identifier (similar to the IP address) and then, based on this identifier, the aircraft may be automatically subscribed to a multicast channel through which data of interest (surrounding aircraft, weather reports, etc.) may be transmitted.

In an embodiment, a method for aircraft tracking includes partitioning an airspace region into multiple sectors. The method further includes generating multiple data structures corresponding respectively to each of the multiple sectors, where each data structure of the multiple data structures has a primary identifier. The method also includes, for each of the multiple sectors, determining a range of interest that includes at least one other sector, where each data structure of the multiple data structures further includes at least one secondary identifier that matches the primary identifier of the data structure corresponding to the at least one other sector. The method includes receiving at least one data packet from an aircraft located within one of the multiple sectors. The method further includes retrieving the primary identifier of the data structure corresponding to the one of the sectors based on aircraft data from the data packet. The method also includes storing at least a portion of the aircraft data from the data packet within the data structure corresponding to the one of the sectors. The method includes storing the portion of the aircraft data within each of the data structures that has a secondary identifier matching the primary identifier of the data structure corresponding to the one of the sectors. The method further includes, for each of the multiple sectors, sending each aircraft within the sector aircraft data stored within the data structure corresponding to the sector.

In some embodiments, the data packet is an Internet Protocol data packet. In some embodiments, the aircraft data includes information about a position of the aircraft. In some embodiments, the aircraft data of the data packet includes an indication of longitude, an indication of latitude, and a unique identifier associated with the aircraft, where retrieving the primary identifier includes mapping the longitude and the latitude to the primary identifier via a lookup table. In some embodiments, the aircraft data of the data packet includes an indication of the primary identifier and a unique identifier associated with the aircraft. In some embodiments, the aircraft data of the data packet includes an indication of the primary identifier, an indication of longitude, an indication of latitude, and a unique identifier of the aircraft. In some embodiments, the aircraft data is included in a source address of the data packet. In some embodiments, a version field of the data packet includes a pre-established value different than values assigned in version fields for Internet Protocol version 4 (IPv4) packets and Internet Protocol version 6 (IPv6) packets. In some embodiments, the method further includes establishing multicast groups, where each of the multicast groups corresponds respectively to each of the sectors, and where sending each aircraft within the sector aircraft data stored within the data structure corresponding to the sector is performed using multicast methods based on the multicast groups. In some embodiments, the multiple data structures include database tables.

In an embodiment, a system for aircraft tracking within an airspace region that is partitioned into multiple sectors includes a database including multiple data structures corresponding respectively to each of the sectors, where each data structure of the multiple data structures has a primary identifier, where each data structure of the multiple data structures further includes at least one secondary identifier that matches the primary identifier of another data structure corresponding to another sector within a range of interest. The system further includes a communications unit configured to receive at least one data packet from an aircraft located within one of the sectors and configured to, for each of the sectors, send each aircraft within the sector aircraft data stored within the data structure corresponding to the sector. The system also includes a ground-based server with a control unit. The control unit is configured to retrieve the primary identifier of the data structure corresponding to the one of the sectors based on aircraft data from the data packet. The control unit is further configured to store at least a portion of the aircraft data from the data packet within the data structure corresponding to the one of the sectors. The control unit is also configured to store the portion of the aircraft data within each of the data structures that has a secondary identifier matching the primary identifier of the data structure corresponding to the one of the sectors.

In some embodiments, the data packet is an Internet Protocol data packet. In some embodiments, the control unit is further configured to establish multicast groups, where each of the multicast groups corresponds respectively to each of the sectors, and where sending each aircraft within the sector aircraft data stored within the data structure corresponding to the sector is performed using multicast methods based on the multicast groups. In some embodiments, the multiple data structures include database tables.

In an embodiment, a method for aircraft tracking includes generating, in an aircraft, a data packet header, where a source address of the data packet header includes information about the position of the aircraft. The method further includes generating, in the aircraft, one or more data packets that include the data packet header. The method also includes transmitting the one or more data packets to a receiver.

In some embodiments, the source address includes an indication of longitude, an indication of latitude, and a unique identifier associated with the aircraft. In some embodiments, the source address includes an indication of a primary identifier associated with a sector in which the aircraft is positioned and a unique identifier associated with the aircraft. In some embodiments, the source address further includes an indication of longitude and an indication of latitude. In some embodiments the method includes receiving position information regarding at least one additional aircraft within a same sector as the aircraft, and calculating a distance to the at least one additional aircraft. In some embodiments, a version field of the data packet includes a pre-established value different than values assigned in version fields for IPv4 packets and IPv6 packets.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION

The present disclosure relates to a method and system to optimize the performance of an aircraft surveillance system based on the secure air traffic data transfer through IP channels.

The aircraft surveillance method can be summarized with the following three steps:

1. Airspace sectorization: Partitioning the airspace and implementing a database based on the partitions with multiple tables, or other data structures, each table storing aircraft information corresponding to aircraft within the sector and aircraft information corresponding to aircraft within the surrounding sectors of interest (sectors within a determined range of interest).

2. Providing an identifier to each aircraft based on its location.

3. Using multicast techniques to provide each aircraft with information pertaining to the surrounding traffic, (e.g., the aircraft information).

The information of the surrounding traffic may be provided to each aircraft by a ground-based server.

Figure 1:
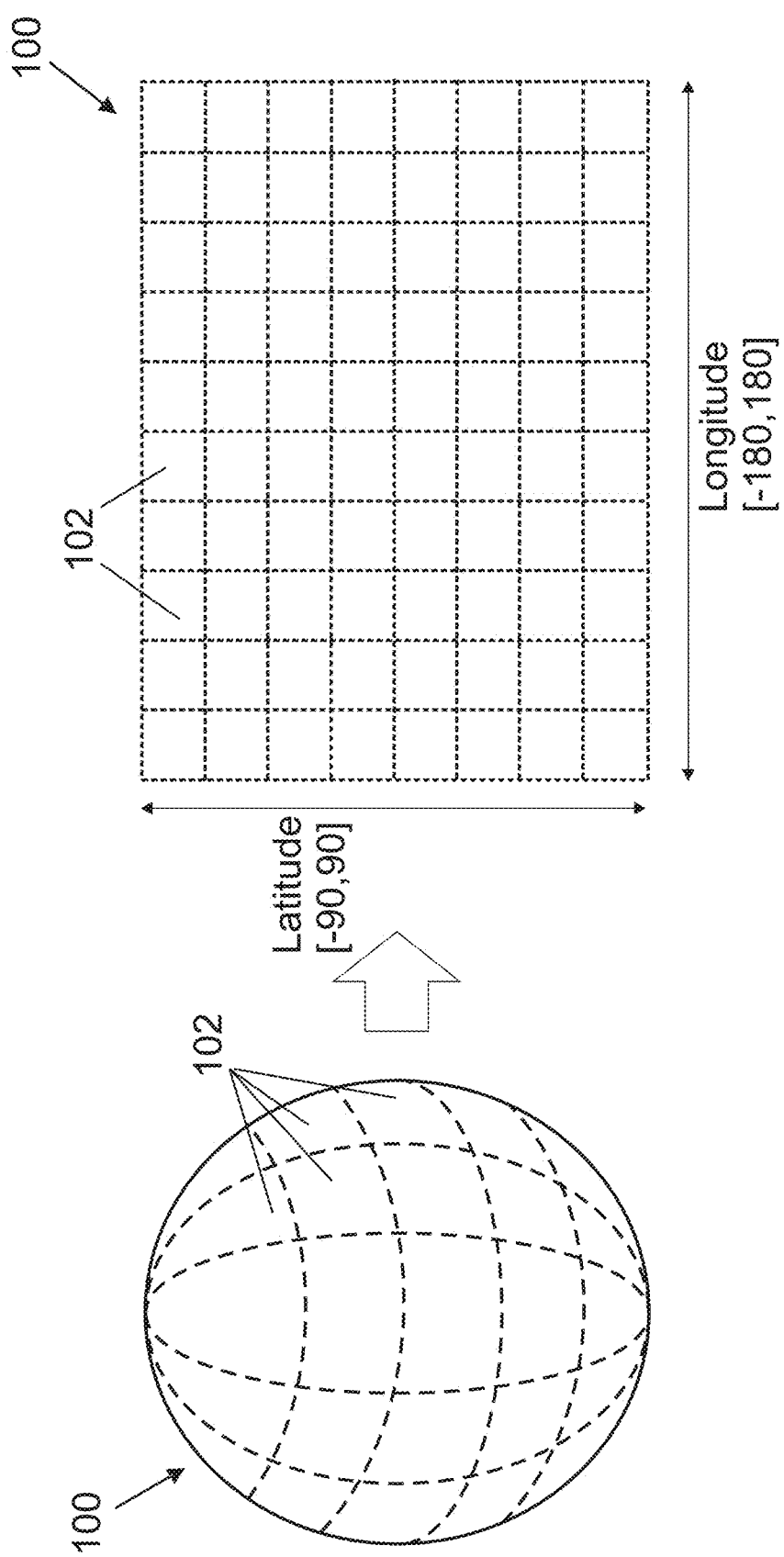
FIG. 1 is a diagram depicting an embodiment of airspace sectorization.

The first step of the method refers to the airspace sectorization, which includes partitioning an airspace region 100 into a plurality of sectors 102 based, for example, on latitude and longitude, as shown in FIG. 1. The airspace region can be the global airspace region of the Earth or a portion thereof.

The range of current aircraft communication systems is limited by the attenuation of the signal transmitted and the sensitivity of the receiver, according to the following equation:

$$P_{RX}=P_{TX}-L$$

Where $P_{RX}$ is the power of the signal received (dBm), $P_{TX}$ is the power of the signal transmitted (dBm), and L is the attenuation suffered by the signal (dB).

However, when using Internet Protocol (IP) techniques, there is no limitation based on the attenuation of the transmitted signal. A system using such IP techniques will have to deal with the information of each flying aircraft, independently of its location. In order to determine the information of interest to be sent to each of the aircraft, it is beneficial to artificially limit the range of the system.

Figure 2:
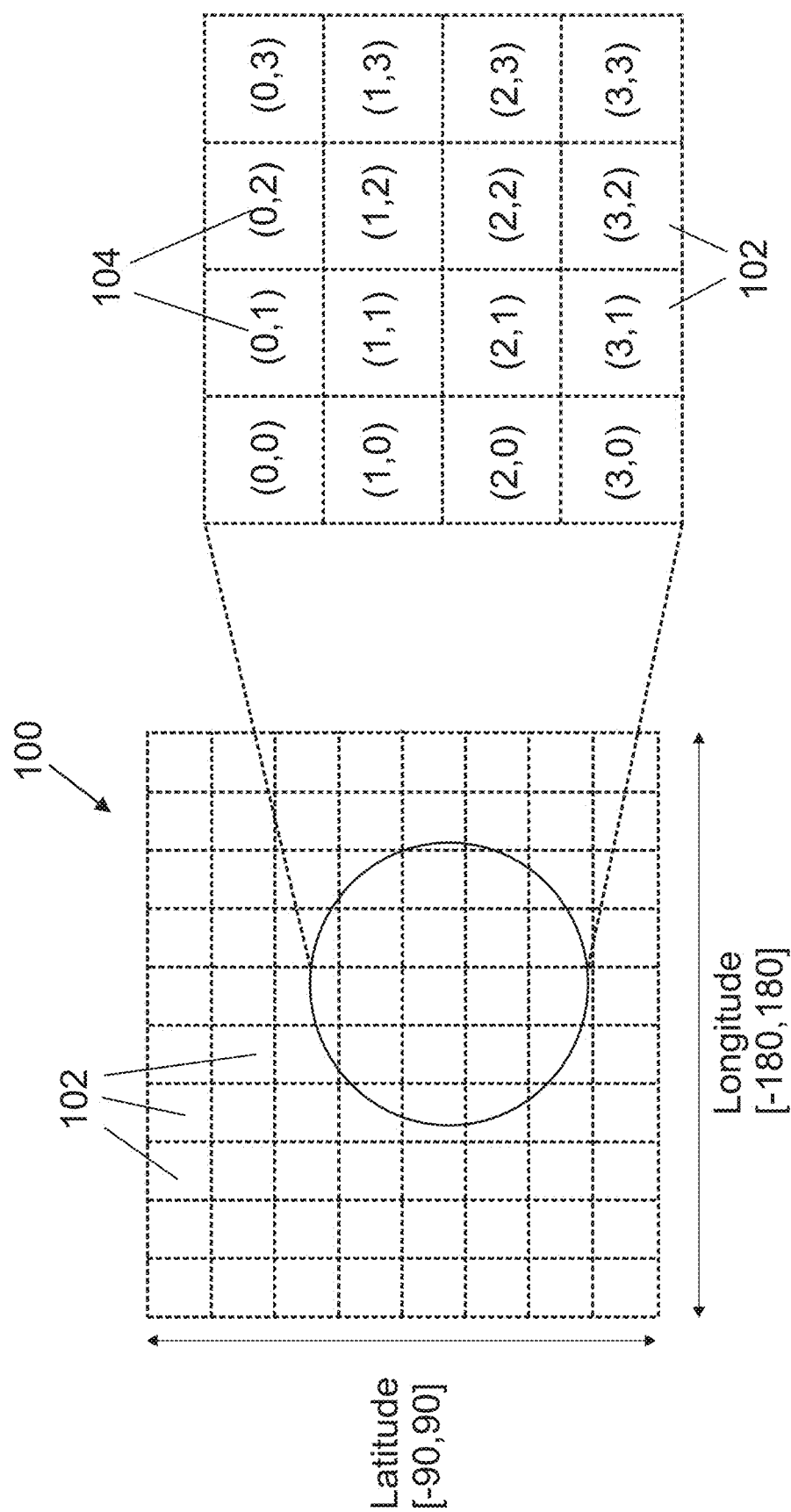
FIG. 2 is a diagram depicting an embodiment of sectorized airspace in which primary identifiers are assigned to sectors.

The present method may be based on a sectorization of the airspace 100, where each of the sectors 102 of the grid is associated with a primary identifier 104 (as shown in FIG. 2), based on the latitude and longitude. FIG. 2 represents an example of assignment of primary identifiers 104 to sectors 102 of the airspace region 100.

Figure 3:
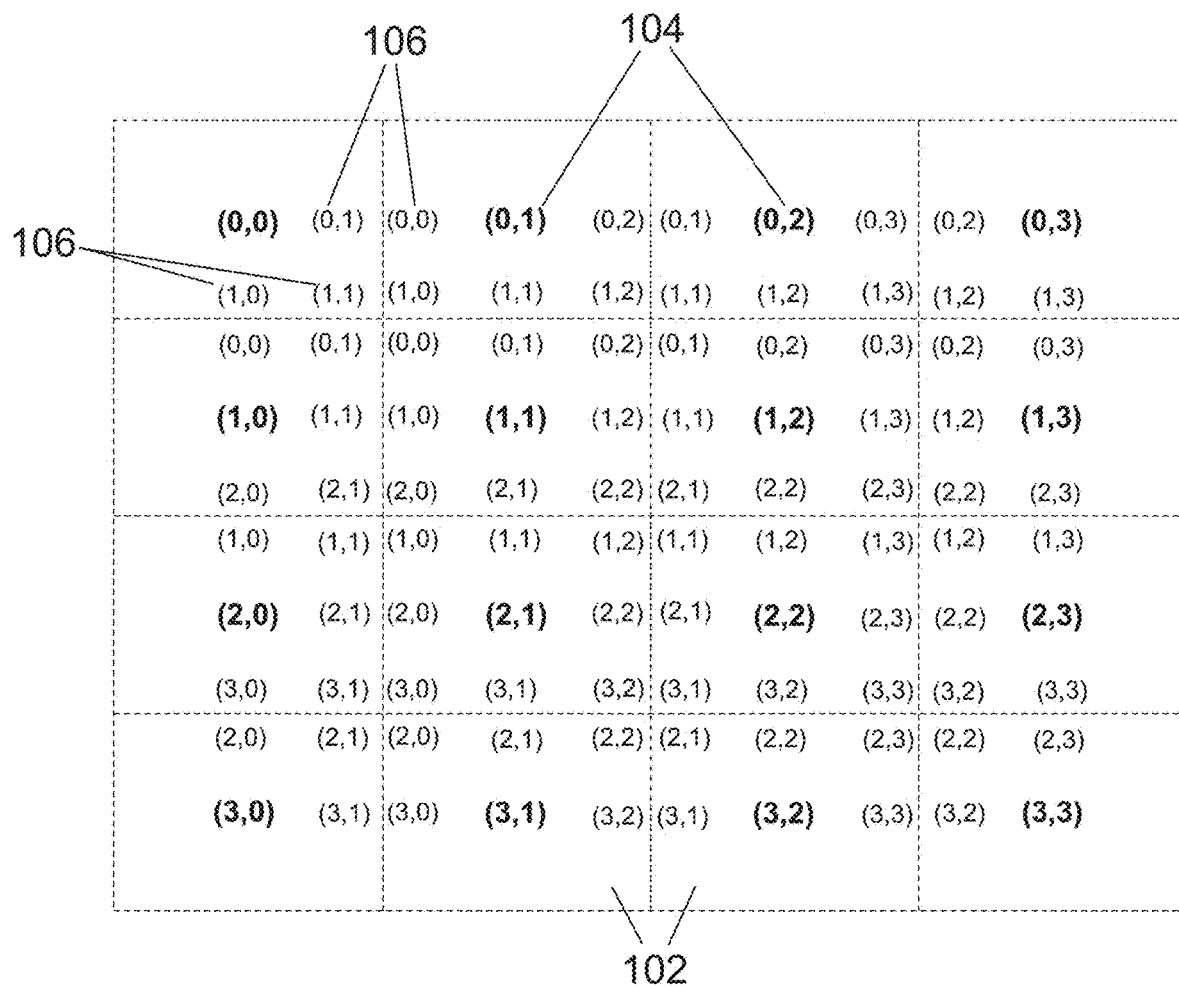
FIG. 3 is a diagram depicting an embodiment of sectorized airspace in which primary and secondary identifiers are assigned to each sector.

The method may also include assigning secondary identifiers to each of the sectors of the grid, based on the surrounding sectors (i.e., the sectors within a zone of interest). FIG. 3 depicts the example of FIG. 2 with primary identifiers 104 (in the middle of each sector) and secondary identifiers 106 (in the periphery of each sector) assigned to each sector 102.

The purpose of the secondary identifiers 106 may be to artificially establish the area or range of interest of each aircraft. As the surface of the sectors vary based on the latitude and longitude, in order to establish a range of interest (e.g. 120 nautical miles) not all the sectors 102 have the same number of secondary identifiers 106.

Figure 4:
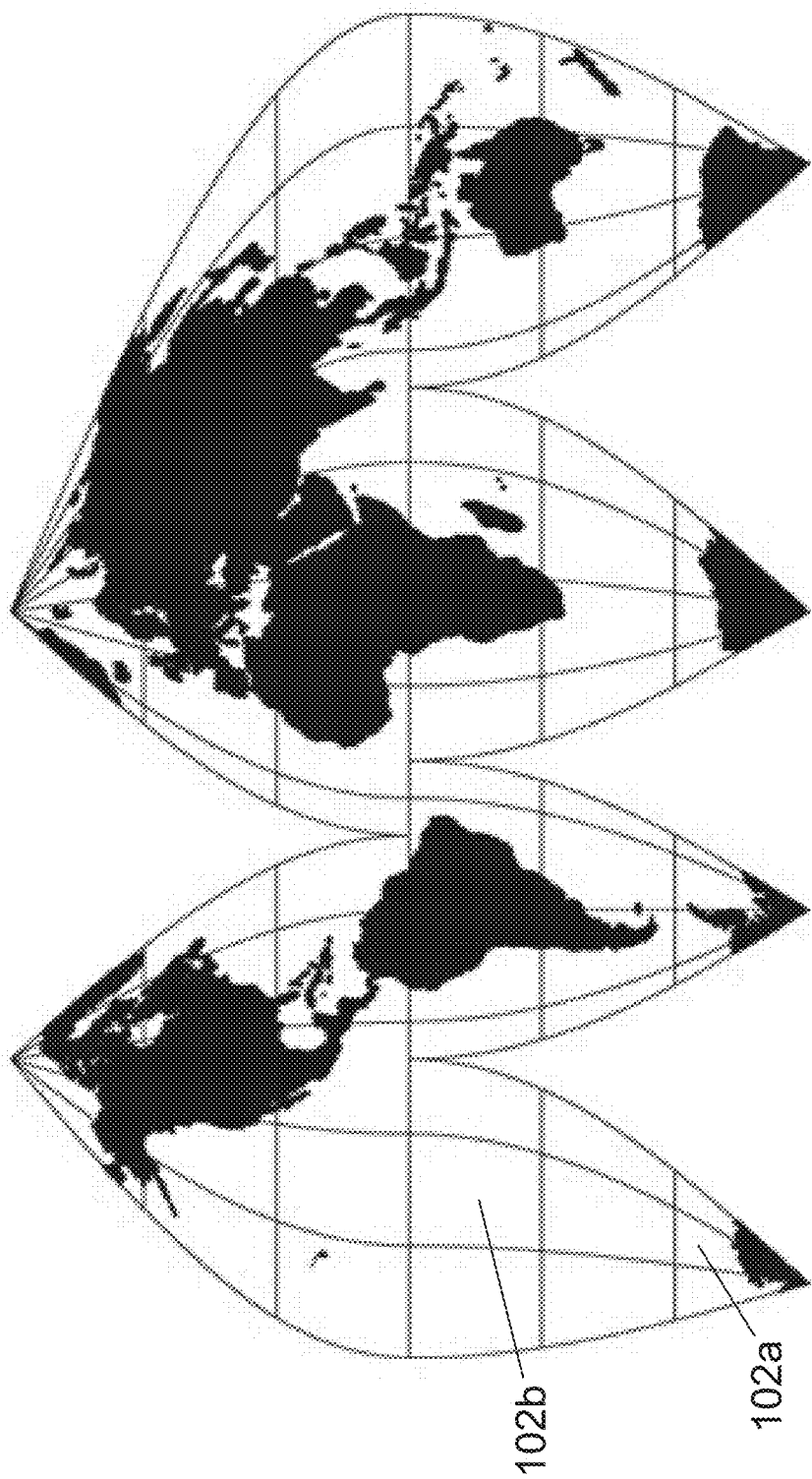
FIG. 4 is a diagram depicting differences in sectors size depending on latitude.

FIG. 4 depicts the different size of the sectors 102 depending on latitude. Near the poles the sectors 102*a* are smaller; however, next to the equator the sectors 102*b* are much larger. Therefore, an aircraft flying in a given sector 102*a* near the poles will need more surrounding sectors in order to obtain from the server the air traffic in the range of interest. On the other hand, an aircraft flying in a given sector 102*b* near the equator will need a smaller number of surrounding sectors to obtain from the server the air traffic in the same range of interest, which is normally set to around 120 nautical miles.

Figure 5:
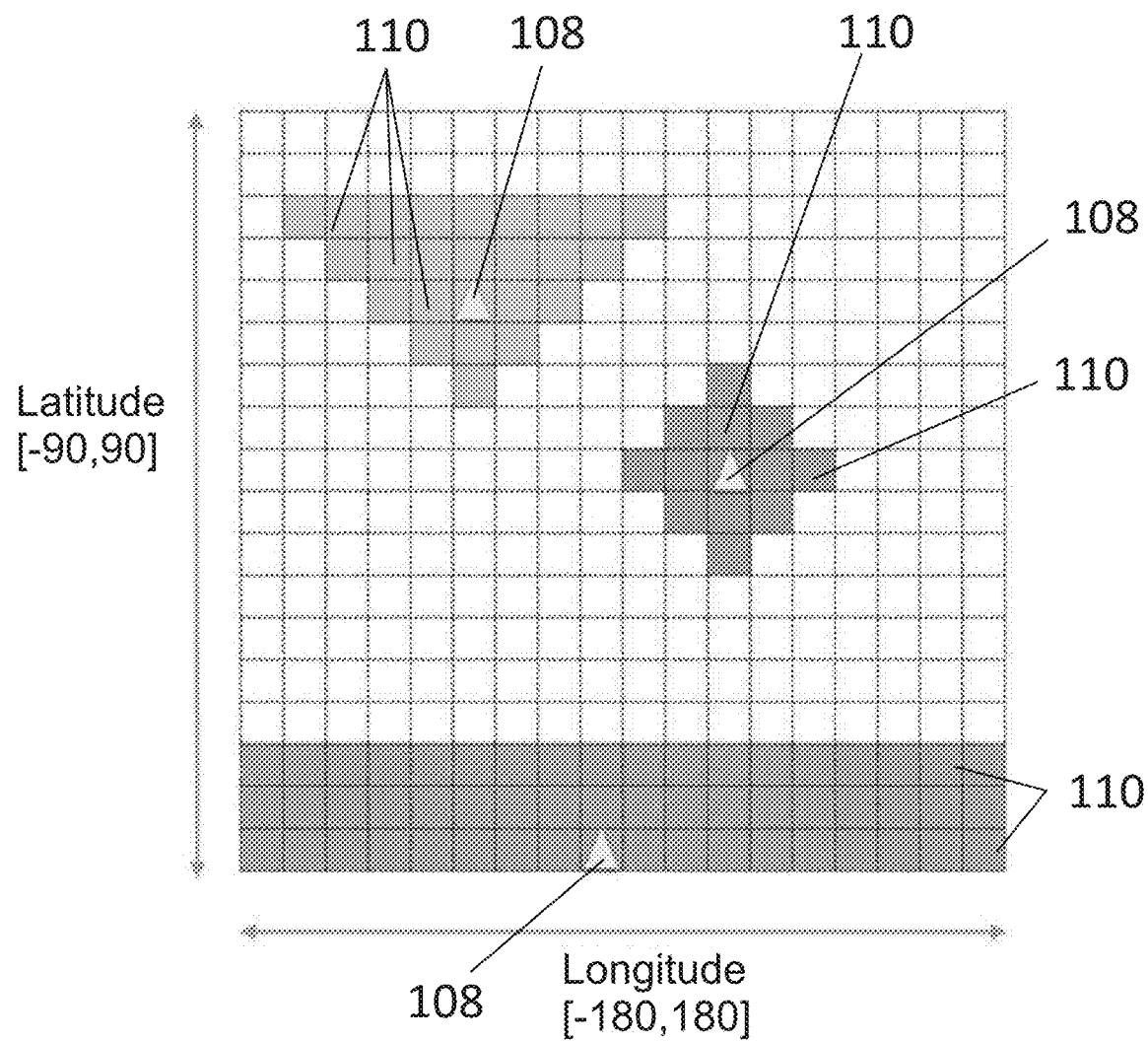
FIG. 5 is a diagram depicting examples, for different latitudes of a primary sector, of surrounding sectors within a range of interest of the primary sector.

FIG. 5 shows examples of different ranges of interest having different shapes resulting in different configurations of surrounding sectors 110 within the range of interest. Each range of interest has a primary sector 108 where the aircraft (marked with a triangle) is located. In order to establish a determined range of interest to cover, the number of surrounding sectors 110 of interest depends on the location of the aircraft, and more particularly on the latitude of the primary sector 108 where the aircraft is located. As shown in FIG. 5 the number of surrounding sectors 110 within the range of interest is much larger when the primary sector is located near the pole.

As represented in FIG. 3, each sector 102 may be associated with a primary identifier 104 (which may be unique and may be based on the longitude and latitude of the sector) and a plurality of secondary identifiers 106 to cover a range of interest (120 nautical miles for a system equivalent to ADS-B). The method may include determining, for each of the sectors 102, the surrounding sectors 110 located within the range of interest. The method may further include associating each of the sectors 102 with the secondary identifiers 106. The secondary identifiers 106 may correspond to the primary identifiers 104 of the surrounding sectors 110 located within the range of interest to the corresponding sector 102.

Figure 6:
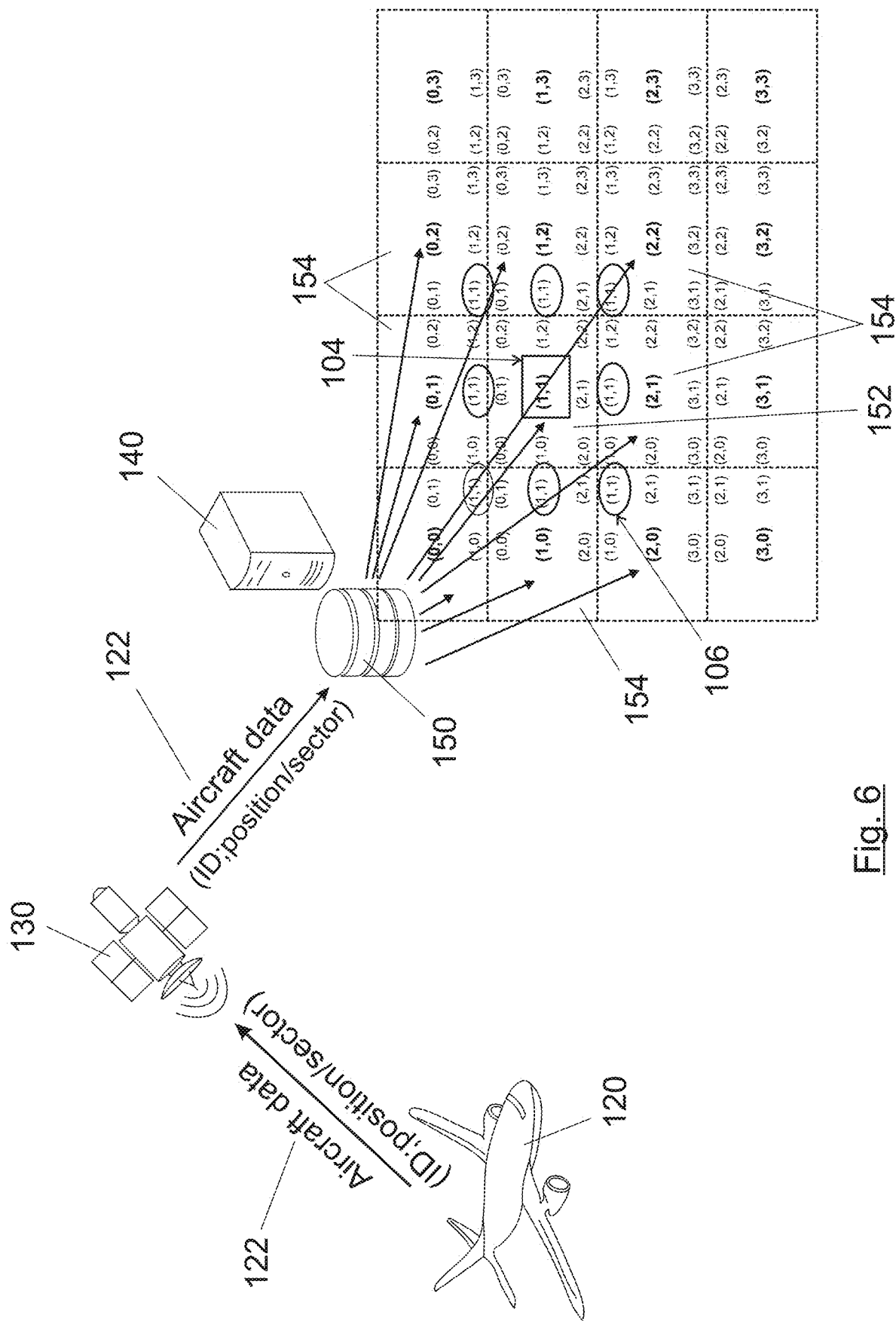
FIG. 6 is a diagram depicting a system for aircraft tracking including a ground-based server storing aircraft data.

FIG. 6 depicts a system for aircraft tracking and shows the storing of information in a database 150 of a ground-based server 140. An aircraft 120 may determine its position using instruments onboard (e.g. geographical coordinates obtained by a global navigation satellite system (GNSS) receiver). The aircraft 120 may send data 122 including an aircraft identifier and the aircraft position using the interne connection onboard through a satellite 130.

The server 140 may then receive the aircraft data and, based on the aircraft location, may record the information in a database 150. The server 140 may obtain, using the aircraft position, the sector 102 in which the aircraft is currently located. Alternatively, the aircraft data may include information indicating the sector 108 in which the aircraft 120 is located, obtained by the aircraft 120 using a correlating table.

The server 140 may store the aircraft data in a table 152 corresponding to the sector 108 where the aircraft 120 is located. In the example of FIG. 6, this is the sector with primary identifier (1,1). Moreover, the aircraft data may also be stored in the tables 154 corresponding to the surrounding sectors 110 located within the range of interest. In the example of FIG. 6, the surrounding sectors are those with secondary identifier (1,1).

Therefore, the database 150 may store the information in one table per sector, each table being associated with the primary identifier 104. When information from an aircraft 120 is received, the data may be stored not only in the table 152 associated with the sector 108 where the aircraft is located, but also in the tables 154 associated with the surrounding sectors 110 within the range of interest, the surrounding sectors 110 having a secondary identifier 106 that matches the primary identifier 104 of the sector 108 where the aircraft 120 is located. In the case represented in FIG. 6, the data may be stored in the table 152 with primary identifier (1,1) and in the tables 154 of the surrounding sectors 110 having the secondary identifier (1,1).

The method may also include providing an aircraft identifier to each aircraft. For example, an aircraft IP address may be autonomously and dynamically generated based on geolocation.

Figure 7A:
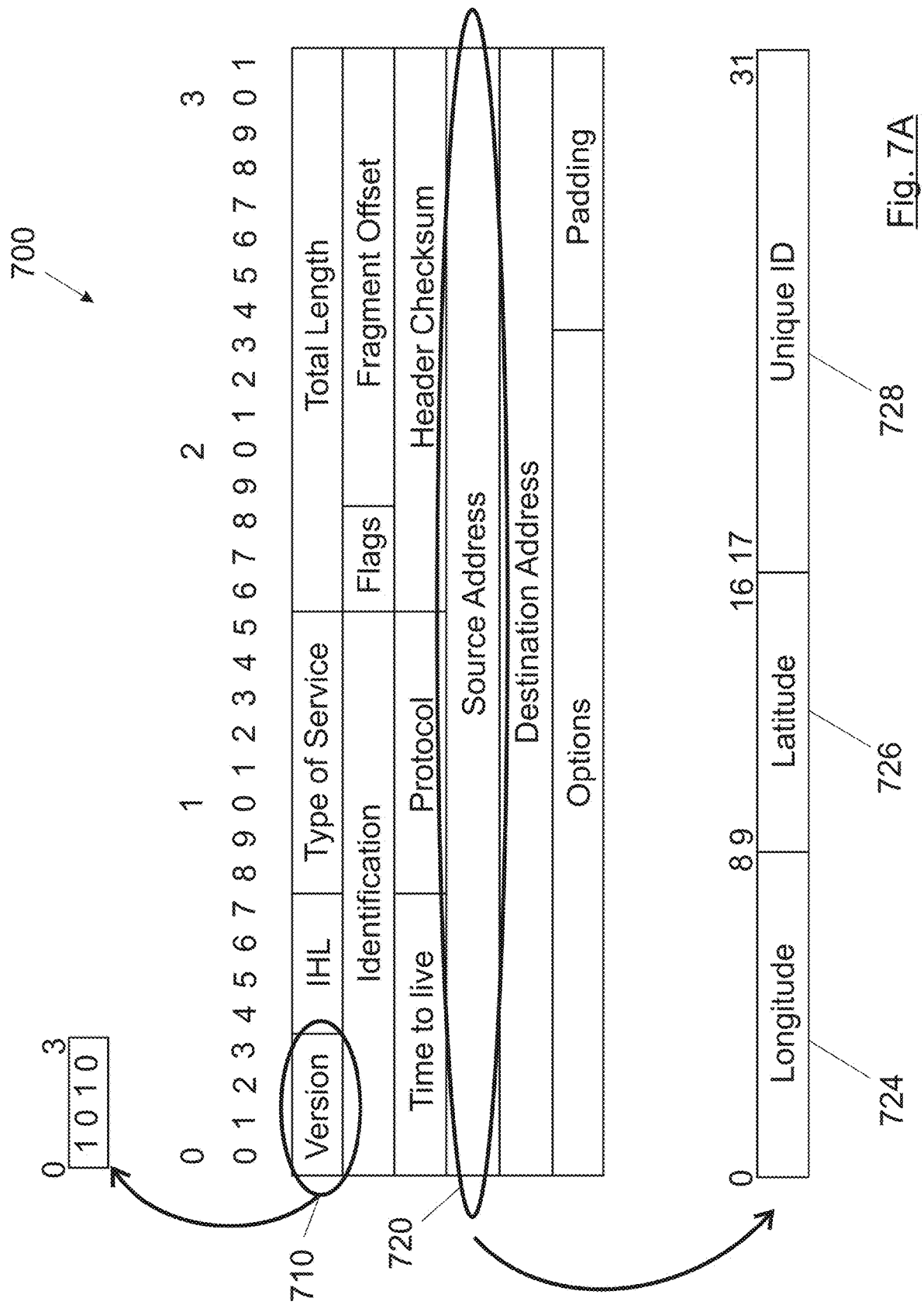
FIGS. 7A and 7B depict embodiments of a header of an IP Packet that may be autonomously generated by an aircraft based on its geolocation.
Figure 7B:
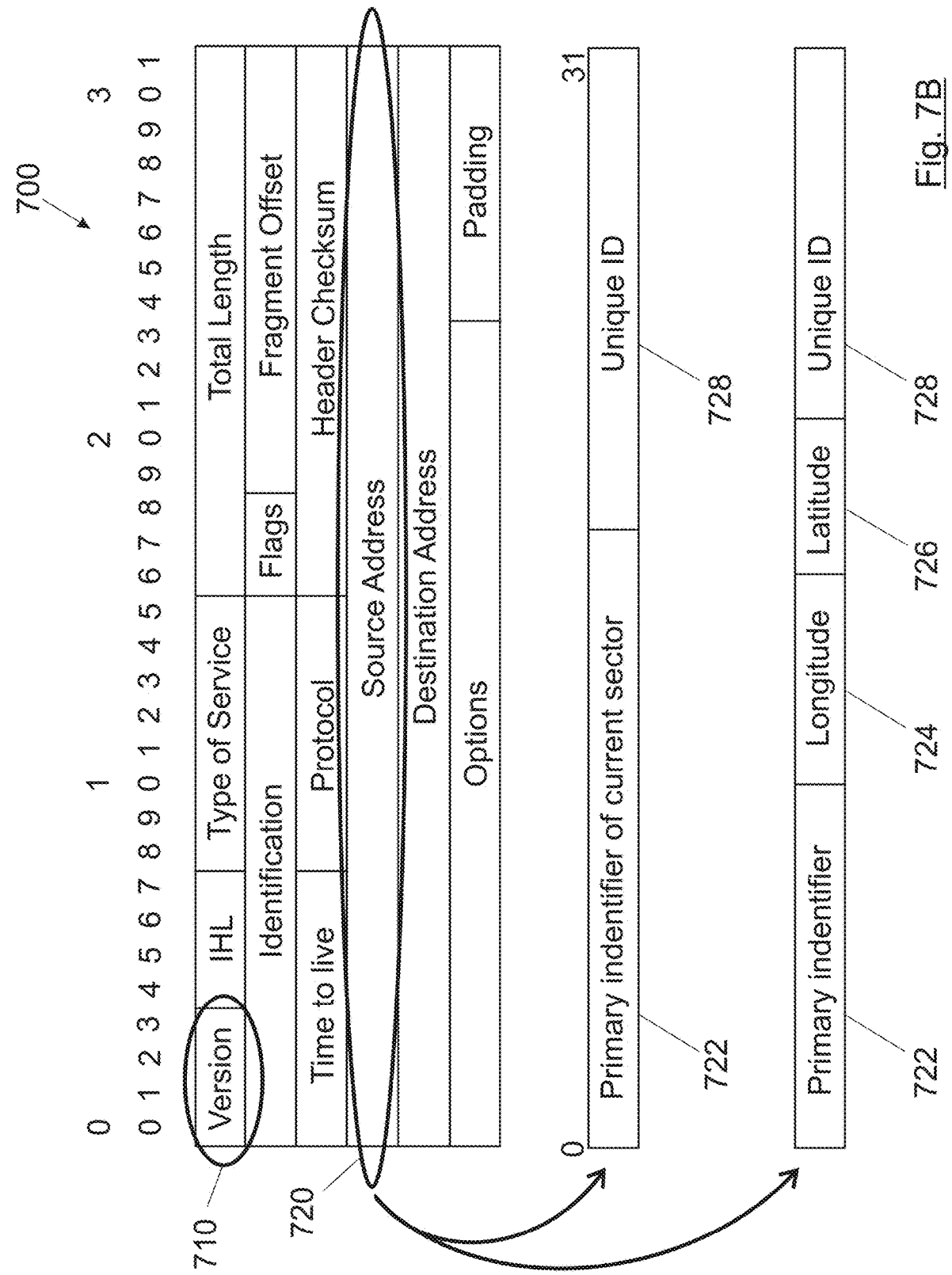

The header 700 of an IP packet, as depicted in the examples of FIGS. 7A and 7B, may include the following customized fields:

Version 710: The first header field in an IP packet may be the four-bit version field. This field is used to indicate the format of the IP header (e.g. for IPv4, this has a value of 4). Any available value (such as a value of 10) may be used for this field to indicate that the format of the IP packet is the one used in the present IP-based protocol. Knowing the IP protocol used, the receiver will be able to interpret the customized fields of the IP packets.

Source address 720: This field may be the address of the sender of the IP packet. According to a first embodiment of the IP-based protocol shown in FIG. 7A, the source address field contains the following data:

Bits 0-8: The integer value of the current longitude 724 of the aircraft 120 is coded in the first nine bits. It may include longitude values within [−180, 180].

Bits 9-16: The integer value of the current latitude 726 of the aircraft 120 is included in the following eight bits. It may include latitude values within [−90, 90].

Bits 17-31: A randomly generated value, unique identifier 728, is included here. It may help to establish a unique source IP address. A new value may be generated when the longitude 724 and/or the latitude 726 change.

According to another embodiment, shown in FIG. 7B, instead of including the longitude 724 and latitude 726 of the aircraft 120, the source address 720 may include a prefix or first sub-field 722 with the primary identifier 104 of the current sector 108 where the aircraft 120 is located, along with the unique identifier 728. Alternatively, as shown below, the source address 720 may include a first sub-field 722 with the primary identifier 104 of the sector 108 where the aircraft 120 is located, in addition to the longitude 724 and latitude 726 of the aircraft 120 and the unique identifier 728. To obtain the content of the first sub-field 722, a control module installed onboard may access a local database to retrieve the primary identifier 104 of the sector 108 corresponding to the current position (longitude and latitude) of the aircraft 120.

In the embodiments of FIGS. 7A and 7B different sizes in bits for the sub-fields of the source address 720 (primary identifier 722, longitude 724, latitude 726, unique identifier 728) may be used.

This IP-based protocol enables the ground-based server 140, by analyzing the source address field 720 of the IP header 700 received, to determine where (i.e. in which tables) to store the information sent by each aircraft 120.

The IP header 700 also allows grouping the surrounding aircraft by IP address. In the embodiments of FIG. 7B, all of the aircraft within the same sector will share the first sub-field 722 (containing the primary identifier 104 of the current sector 108) of the source address 720. For the embodiment of FIG. 7A, if the sectors 102 are defined with a size of 1° latitude×1° longitude, every aircraft within the same sector will share the first two sub-fields (724,726) of the source address 720. This feature may be useful to determine multicast groups.

Figure 8:
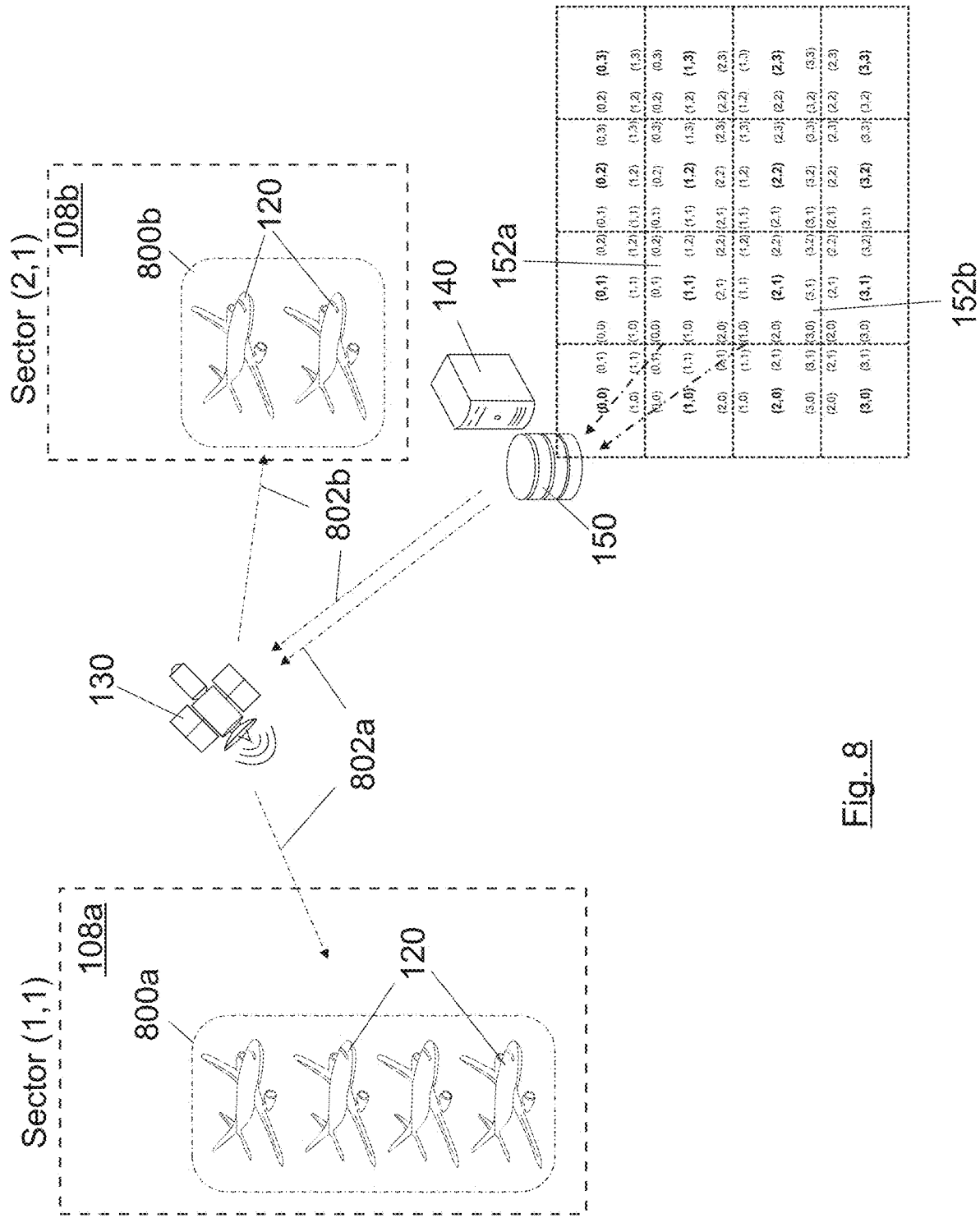
FIG. 8 is a diagram depicting an example of multicast channels and multicast groups within an embodiment of a system for aircraft tracking.

According to the embodiment of FIG. 8, the information received by the server 140 may be distributed back to the aircraft 120 by means of multicast groups (800a, 800b). Multicasting groups (800a, 800b) are established taking into account the IP address of the aircraft. All of the aircraft 120 within the same sector (108a, 108b) may share the first sub-field 722 of the source address 720 according to the embodiment of FIG. 7B (or the first 17 bits corresponding to the longitude 724 and latitude 726 in the embodiment of FIG. 7A), and may therefore receive the same information each cycle. This feature may reduce the calculations to be performed by the server 140, as well as the number of IP packets to be sent.

All of the aircraft 120 belonging to the same multicast group (800a, 800b) may be geographically located in the same sector (108a, 108b). Each multicast group (800a, 800b) may correspond to a different sector (108a, 108b). Different multicast channels (802a, 802b) may be established to distribute the information stored in the table (152a, 152b) of the database 150 corresponding to the sector (108a, 108b) of the multicast group (800a, 800b).

Information is sent to the aircraft using the internet connection onboard. Each aircraft receives only the information of interest associated to the sector on which the aircraft is located, the being data sent through the multicast channel the aircraft belongs to.

This way, the server 140 acts as a first filter of the information. In the example of FIG. 8, all of the aircraft 120 flying in a first sector 108a, sector (1,1), may receive the same data, which includes the information stored in the table 152a associated to the sector (1,1), having as primary identifier (1,1). Because the primary identifier is also the secondary identifier for sectors {(0,0), (0,1), (0,2), (1,0), (1,1), (1,2), (2,0), (2,1), (2,2)}, the data in the table 152a may include aircraft data 122 (e.g., aircraft identifier and aircraft position) for each aircraft in these sectors. Similarly, the server 140 may send the same data to all the aircraft 120 flying in a second sector 108b, sector (2,1): the information stored in the table 152b associated to the sector (2,1), having as primary identifier (2,1), and therefore including the aircraft data 122 of all the airplanes flying in sectors {(1,0), (1,1), (1,2), (2,0), (2,1), (2,2), (3,0), (3,1), (3,2)}.

Once an aircraft 120 receives from the server 140 the identifier and position of the airplanes flying in its sector (108) and the surrounding sectors (110) within the range of interest, said aircraft 120 may then compute the distance to all these airplanes. Trigonometric calculations can therefore be performed by the client, the aircraft 120, over a very limited number of airplanes (only over those within a determined range). Therefore, trigonometric calculations performed by the server 140 are greatly reduced, optimizing the performance and avoiding saturation of the server 140.

Figure 9:
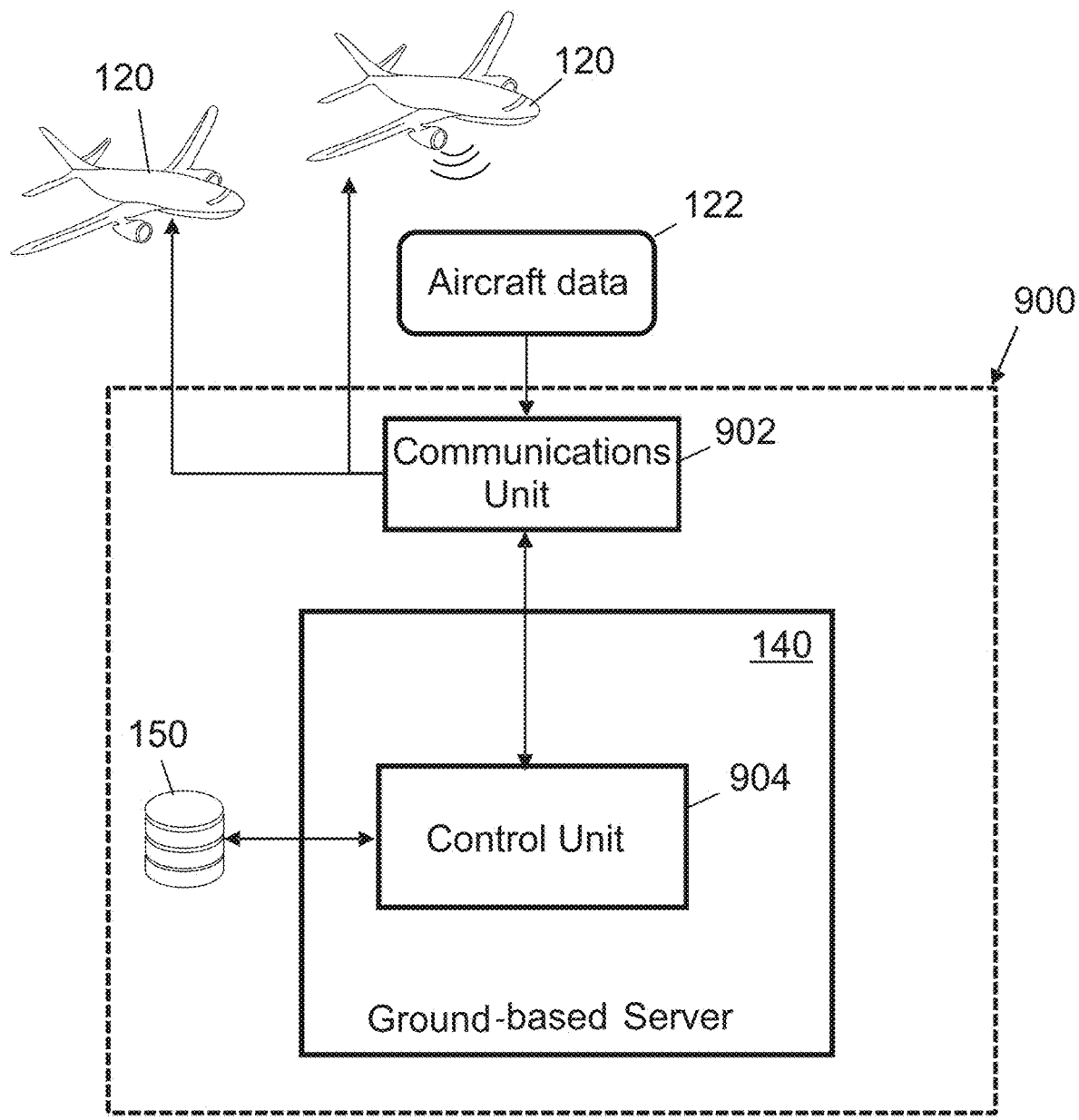
FIG. 9 is a block diagram depicting an embodiment of an aircraft surveillance and tracking system.

An embodiment of an aircraft surveillance and tracking system 900, implementing the method previously described, is depicted in FIG. 9. The system 900 comprises a communications unit 902, a ground-based server 140 and one or more database 150. The communications unit 902 may be configured for receiving and sending aircraft data 122 from/to one or more aircraft 120.

The ground-based server 140 may include a control unit 904. When aircraft data 122 from an aircraft 120 is received, the control unit 904 may determine the primary identifier 104 of the sector 108 on which the aircraft 120 is located and store the aircraft data 122 on the database 150. In particular, the information may be stored on a table 152 associated to the sector 108 having said primary identifier 104 and on each of the tables 154 associated with the surrounding sectors 110 having a secondary identifier 106 correspondent with said primary identifier 104, and being within the zone of interest of the sector 108.

The communications unit 902 may repeatedly transmit to each aircraft 120 the aircraft data stored in the table 152 associated with the sector 108 in which the corresponding aircraft 120 is located.

Figure 10:
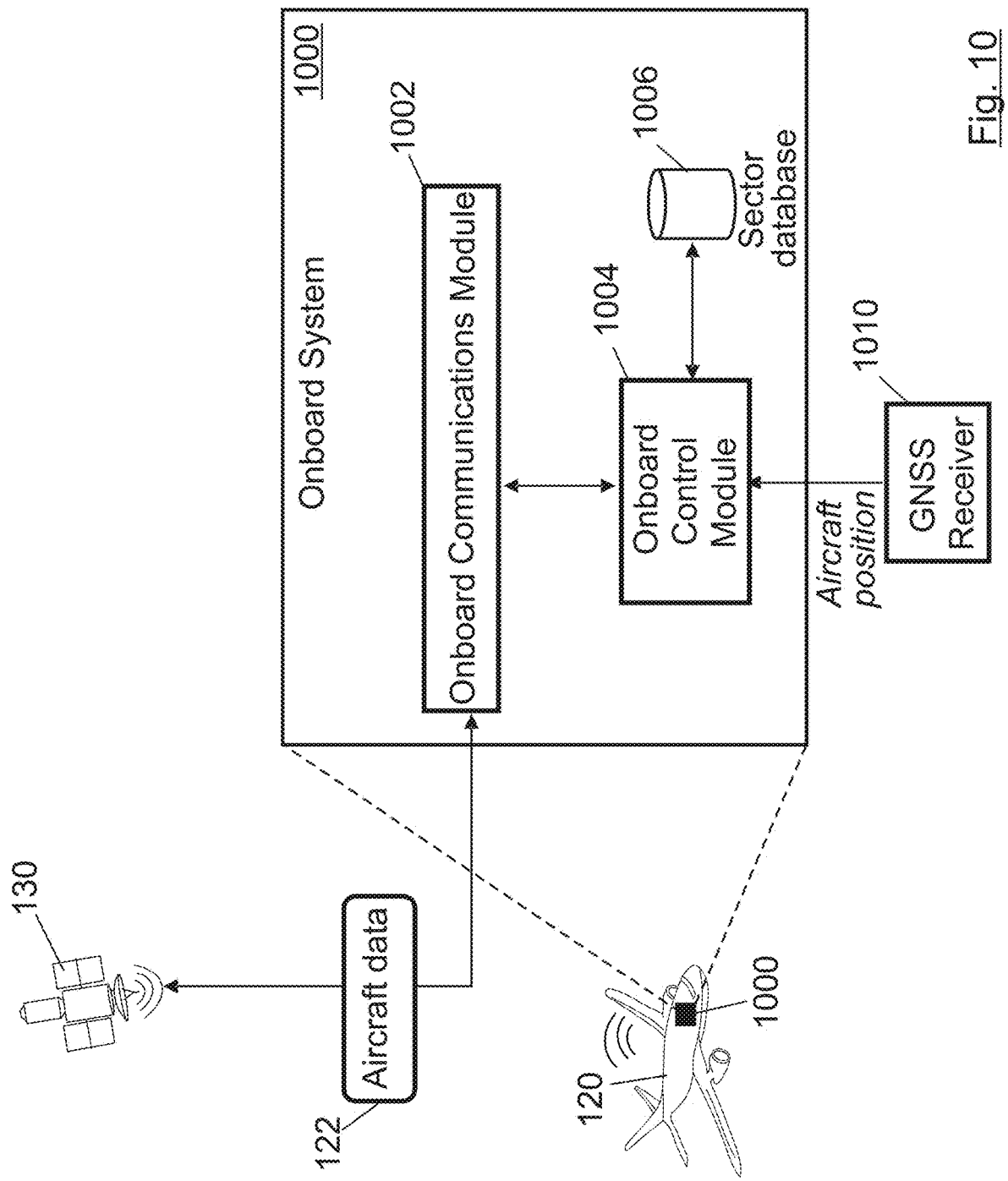
FIG. 10 is a block diagram depicting an embodiment of an onboard system for communicating aircraft data.

FIG. 10 depicts an embodiment of an onboard system 1000, installed on an aircraft 120, for communicating aircraft data for aircraft surveillance and tracking. The onboard system 1000 may be part of the Flight Management System (FMS) or a separate entity. The onboard system 1000 may include an onboard communications module 1002 and an onboard control module 1004.

The onboard control module 1004 may retrieve information about the position of the aircraft 120. In particular, the onboard control module 1004 may obtain the aircraft position (longitude, latitude) from a relevant avionics system (such as GNSS receiver 1010). The onboard control module 1004 may also obtain the primary identifier 104 of the sector 108 corresponding to the current aircraft position by accessing a sector database 1006 storing the correspondence between the coordinates of the aircraft (longitude and latitude) and sectors 102. The information about the position of the aircraft 120 may include the aircraft position (longitude, latitude), the primary identifier 104 of the sector 108 on which the aircraft 120 is located, or both.

The onboard control module 1004 may then generate a header 700 of an IP packet. The header 700 may include a version 710 field with an assigned pre-established value different than the value assigned to IPv4 or IPv6 and a source address 720 field including the retrieved information about the position of the aircraft 120. The onboard control module 1004 may generate aircraft data 122 including at least one IP packet with the previously generated header 700 and may send the generated aircraft data 122 through the onboard communications module 1002 to a receiver (e.g., the communications unit 902 of the system of FIG. 9).

The onboard control module 1004 may also receive, originating from the server 140, IP packets with aircraft data corresponding to other aircraft located within the same sector 108 and within the surrounding sectors 110 within the range of interest. For each IP packet received, the onboard control module 1004 may check if the version 710 of the header 700 coincides with the pre-established value, and then may extract the position of all the surrounding aircraft included in the IP packets. Finally, the onboard control module 1004 may compute the distance to each individual aircraft. This way the data processing load of the ground-based server 140 may be reduced.

The invention claimed is:

1. A method for aircraft tracking comprising:
   partitioning an airspace region into multiple sectors;
   generating multiple data structures corresponding respectively to each of the multiple sectors, wherein each data structure of the multiple data structures has a primary identifier;
   for each of the multiple sectors, determining a range of interest that includes at least one other sector, wherein each data structure of the multiple data structures further includes at least one secondary identifier that matches the primary identifier of the data structure corresponding to the at least one other sector, and wherein each data structure further includes aircraft information, including location information corresponding to aircrafts within the sector and within the at least one other sector within the range of interest;
   receiving at least one data packet from an aircraft located within one of the multiple sectors;
   retrieving the primary identifier of the data structure corresponding to the one of the multiple sectors based on aircraft data from the data packet;
   storing at least a portion of the aircraft data from the data packet as a portion of the aircraft information within the data structure corresponding to the one of the multiple sectors;
   storing the portion of the aircraft data as a portion of the aircraft information within each of the data structures that has a secondary identifier matching the primary identifier of the data structure corresponding to the one of the multiple sectors; and
   sending the aircraft information, including the location information corresponding to the aircrafts within the sector and within the at least one other sector within the range of interest, to the aircraft.

2. The method of claim 1, wherein the data packet is an Internet Protocol data packet.

3. The method of claim 1, wherein the aircraft data includes information about a position of the aircraft.

4. The method of claim 1, wherein the aircraft data of the data packet includes an indication of longitude, an indication of latitude, and a unique identifier associated with the aircraft, wherein retrieving the primary identifier includes wrapping the longitude and the latitude to the primary identifier via a lookup table.

5. The method of claim 1, wherein the aircraft data of the data packet includes an indication of the primary identifier and a unique identifier associated with the aircraft.

6. The method of claim 1, wherein the aircraft data of the data packet includes an indication of the primary identifier, an indication of longitude, an indication of latitude, and a unique identifier of the aircraft.

7. The method of claim 1, wherein the aircraft data is included in a source address of the data packet.

8. The method of claim 1, wherein a version field of the data packet includes a pre-established value different than values assigned in version fields for IPv4 packets and IPv6 packets.

9. The method of claim 1, further comprising:
   establishing multicast groups, wherein each of the multicast groups corresponds respectively to each of the multiple sectors; and
   sending each aircraft within each of the sectors, the aircraft information stored within the data structure corresponding to the sector using multicast methods based on the multicast groups.

10. The method of claim 1, wherein the multiple data structures include database tables.

11. A system for aircraft tracking within an airspace region that is partitioned into multiple sectors, the system comprising:
    a database including multiple data structures corresponding respectively to each of the sectors, wherein each data structure of the multiple data structures has a primary identifier, wherein each data structure of the multiple data structures further includes at least one secondary identifier that matches the primary identifier of another data structure corresponding to another sector within a range of interest;
    a communications unit configured to receive at least one data packet from an aircraft located within one of the sectors and configured to, for each of the sectors, send each aircraft within a sector aircraft information stored within a data structure corresponding to the sector, the aircraft information including location information corresponding to aircrafts within the sector and within the other sector within the range of interest; and
    a ground-based server with a control unit configured to:
    retrieve the primary identifier of the data structure corresponding to the one of the sectors based on aircraft data from the data packet;
    store at least a portion of the aircraft data from the data packet within the data structure corresponding to the one of the sectors; and
    store the portion of the aircraft data within each of the data structures that has a secondary identifier matching the primary identifier of the data structure corresponding to the one of the sectors, wherein, for each of the sectors, the stored portion of the aircraft data makes up at least part of the aircraft information that is sent to each aircraft within the sector.

12. The system of claim 11, wherein the data packet is an Internet Protocol data packet.

13. The system of claim 11, wherein the control unit is further configured to establish multicast groups, wherein each of the multicast groups corresponds respectively to each of the sectors, wherein sending each aircraft within the sector aircraft information stored within the data structure corresponding to the sector is performed using multicast methods based on the multicast groups.

14. The system of claim 11, wherein the multiple data structures include database tables.

15. A method for aircraft tracking comprising:
generating, in an aircraft, a data packet header, wherein a source address of the data packet header includes information about a position of the aircraft and an indication of a primary identifier associated with a sector in which the aircraft is positioned, wherein airspace in which the aircraft is located is partitioned into multiple sectors including the sector in which the aircraft is positioned, and wherein the primary identifier is determined within the aircraft based on a location of the aircraft;
generating, in the aircraft, one or more data packets that include the data packet header;
transmitting the one or more data packets to a receiver; and
receiving position information regarding aircrafts within the sector in which the aircraft is located and within at least one additional sector within a range of interest of the aircraft.

16. The method of claim 15, wherein the source address includes an indication of longitude, an indication of latitude, and a unique identifier associated with the aircraft.

17. The method of claim 15, wherein the source address includes a unique identifier associated with the aircraft.

18. The method of claim 17, wherein the source address further includes an indication of longitude and an indication of latitude.

19. The method of claim 15, further comprising:
calculating, at the aircraft, a distance to the aircrafts within the sector and within the at least one additional sector.

20. The method of claim 15, wherein a version field of the one or more data packets includes a pre-established value different than values assigned in version fields for IPv4 packets and IPv6 packets.

* * * * *